US007028222B2

(12) United States Patent  (10) Patent No.: US 7,028,222 B2
Peterson et al.  (45) Date of Patent: Apr. 11, 2006

(54) TARGET DEVICE-SPECIFIC SYNTAX AND SEMANTIC ANALYSIS FOR A GRAPHICAL PROGRAM

(75) Inventors: Newton G. Peterson, Austin, TX (US); Darshan K. Shah, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 515 days.

(21) Appl. No.: 10/177,553

(22) Filed: Jun. 21, 2002

(65) Prior Publication Data

US 2003/0237026 A1 Dec. 25, 2003

(51) Int. Cl.
G06F 11/00 (2006.01)
(52) U.S. Cl. .................. 714/38; 717/109; 717/113; 717/125; 717/131
(58) Field of Classification Search .................. 714/37, 714/38, 57, 109, 113, 125, 131
See application file for complete search history.

(56) References Cited

U.S. PATENT DOCUMENTS

| 5,210,837 | A |   | 5/1993  | Wiecek |
|-----------|---|---|---------|--------|
| 5,237,691 | A | * | 8/1993  | Robinson et al. ........... 717/107 |
| 5,481,741 | A |   | 1/1996  | McKaskle et al. |
| 5,999,728 | A | * | 12/1999 | Cable .......................... 717/105 |
| 6,091,897 | A | * | 7/2000  | Yates et al. .................. 717/138 |
| 6,182,246 | B1 | * | 1/2001 | Gregory et al. ............... 714/38 |
| 6,286,017 | B1 | * | 9/2001 | Egilsson ...................... 715/503 |
| 6,487,713 | B1 | * | 11/2002 | Cohen et al. ............... 717/105 |
| 6,581,206 | B1 | * | 6/2003 | Chen .......................... 717/143 |
| 6,701,513 | B1 | * | 3/2004 | Bailey ........................ 717/109 |

* cited by examiner

Primary Examiner—Robert Beausoliel
Assistant Examiner—Philip Guyton
(74) Attorney, Agent, or Firm—Meyertons Hood Kivlin Kowert & Goetzel, P.C.; Jeffrey C. Hood; Jason L. Burgess

(57) ABSTRACT

A system and method for performing syntax and/or semantic analysis for a graphical program based on an intended target device for deployment of the graphical program. User input indicating an intended target device for deployment of the graphical program may be received. In one embodiment, the method may operate to determine whether any of the graphical program elements are unsupported for the intended target device of the graphical program. An invalid condition may be indicated for any unsupported elements in the graphical program or to indicate semantic problems.

56 Claims, 7 Drawing Sheets

TARGET DEVICE-SPECIFIC SYNTAX AND SEMANTIC ANALYSIS FOR A GRAPHICAL PROGRAM

FIELD OF THE INVENTION

The present invention relates to the field of graphical programming, and more particularly to a system and method for performing target device-specific syntax and/or semantic analysis for a graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

Graphical programs may be written or constructed according to a particular syntax. For example, a graphical program may be created using a particular graphical programming development environment, where the graphical programming development environment provides certain nodes for use in graphical programs, supports particular techniques for interconnecting the nodes, etc. Thus, the graphical code in a graphical program may be created according to a particular graphical programming "language" or syntax. For example, LabVIEW graphical program developers are familiar with the G programming language used to create LabVIEW programs, as documented in the G Programming Reference Manual, available from National Instruments Corporation.

SUMMARY

One embodiment of the present invention relates to performing syntax and/or semantic analysis for a graphical program based on an intended target device for deployment of the graphical program. In other words, the syntax and/or semantic analysis performed on the graphical program may depend on the type of the intended target device. The graphical program may be analyzed on a first computer system, where the intended target device is different from the first computer system.

According to one embodiment of a method for performing target device-specific syntax and/or semantic analysis for a graphical program, user input indicating an intended target device for deployment of the graphical program may be received. The user input may take various forms. For example, the user input may be received to a graphical programming development environment application used to develop the graphical program. The graphical programming development environment may allow the user to select from a plurality of target devices for deployment of the graphical program.

In various embodiments, the user may be able to select any of various kinds of target devices for deployment of the graphical program. As one example, the available target devices may include FPGA devices or devices including other types of programmable hardware elements. The user may also be able to select specific FPGA models or products.

As another example, the available target devices may include personal digital assistant (PDA) devices. The user may also be able to select specific PDA brands or models.

As another example, the available target devices may include one or more devices including a processor and memory, e.g., where the memory stores a restricted version of a graphical program execution engine. For example, such devices may include devices intended for use in a real-time system. The graphical program may be stored on the device, and the processor may execute the restricted version of the graphical program execution engine to manage the execution of the graphical program.

As another example, the available target devices may include one or more devices which execute a different operating system than the first computer system in which the graphical program is stored or analyzed.

The graphical program may be programmatically analyzed to determine graphical program elements present in the graphical program. Programmatically analyzing the graphical program may include programmatically analyzing one or more data structures representing the graphical program to determine graphical program elements present in the graphical program.

The term "graphical program element" may include any of various elements or objects included in a graphical program. For example, graphical program elements may include nodes in the graphical program. Graphical program elements in the graphical program may also include wires, such as wires or lines that connect various nodes together. Graphical program elements may also include various data types used in the graphical program. Graphical program elements may also include programming structures such as loop structures, case structures, sequence structures, event structures, etc., as well as various program constructs. Graphical program elements may also include various interfaces, such as a communication interface. Graphical program elements may also include user interface elements, such as controls and indicators for providing input to and/or displaying output from the graphical program.

The method may operate to determine whether the graphical program elements present in the graphical program result in one or more syntactic and/or semantic problems for execution on the intended target device. In various embodiments, the method may check for any of various kinds of syntactic and/or semantic problems.

In one embodiment, the method may operate to determine whether any of the graphical program elements are unsupported for the intended target device of the graphical program. As used herein, a graphical program element may be unsupported for the intended target device if one or more of the following apply: if a graphical program cannot be deployed on the intended target device when the graphical program includes the graphical program element; if a graphical program cannot execute on the intended target device when the graphical program includes the graphical program element; and/or if the presence of the graphical program element in a graphical program may cause the graphical program to fail or execute incorrectly on the intended target device. In another embodiment, the method may operate to determine whether any combination of the graphical program elements is unsupported for the intended target device of the graphical program.

In various embodiments, any of various techniques may be used to determine whether any of the graphical program elements (or any combination of the graphical program elements) in the graphical program are unsupported for the intended target device of the graphical program. In one embodiment, this determination may involve determining or accessing a set of supported graphical program elements for the intended target device and determining whether any of the graphical program elements are not in the set of supported graphical program elements for the intended target device. For example, in one embodiment, for each of the graphical program elements in the graphical program, the method may operate to determine whether the respective graphical program element is in a set of supported graphical program elements for the intended target device. In one embodiment, the method may operate to access information, e.g., a database, specifying whether or not a particular graphical program element is supported for a particular target device. Thus, for each graphical program element in the graphical program, the method may access the information to determine whether the respective element is unsupported for the intended target device of the graphical program. In another embodiment, the method may determine whether any of the graphical program elements (or any combination of graphical program elements) in the graphical program are in a set of unsupported graphical program elements (or unsupported combinations) for the intended target device.

In one embodiment, the method may programmatically query the target device to determine software resident on the target device, e.g., the type of a graphical program execution engine, the type of operating system, etc. This information may also be used in determining whether any of the graphical program elements in the graphical program are unsupported. For example, certain graphical program elements may be supported in newer versions of the software but may be unsupported in older versions, or certain graphical program elements may be supported in certain operating systems but not others, etc.

In one embodiment, the method may operate to determine whether any of the graphical elements in the graphical program are used in an unsupported manner for the intended target device. For example, each of the graphical program elements may itself be supported for the intended target device. However, the way in which one or more of the graphical program elements are used may not be supported. Thus, in various embodiments, the method may analyze the semantics of the graphical program as well as the syntax. Semantics for combinations of graphical program elements may be analyzed, as well as semantics for individual graphical program elements. Similarly as described above, verification information which describes supported and/or unsupported uses of graphical program elements may be utilized in determining whether the semantics of the graphical program are valid or invalid for the intended target device.

In one embodiment, the method may be operable to analyze the graphical program to determine whether the meaning or semantics of any of the graphical program elements in the graphical program are different on the intended target device than the meaning or semantics on the first computer system which stores or analyzes the graphical program. For example, each of the graphical program elements may be supported, and the graphical program elements may be used in a manner supported for the intended target device, but the semantics or program behavior of one or more of the graphical program elements may be different on the target device. Also, in addition to checking for semantic differences in individual graphical program elements, the method may check for semantic differences for combinations of graphical program elements or programming constructs utilized in the graphical program.

An invalid condition may be indicated if any syntactic and/or semantic problems were found. For example, an invalid condition may be indicated if any of the graphical program elements in the graphical program are unsupported for the intended target device of the graphical program. In various embodiments, the invalid condition may be indicated in any of various ways. In one embodiment, indicating the invalid condition may include displaying information to indicate that one or more of the graphical program elements are unsupported. For example, text information may be displayed to indicate that one or more of the graphical program elements are unsupported. For example, a list of error messages related to the unsupported graphical program elements may be displayed.

In another embodiment, displaying information to indicate that one or more of the graphical program elements are unsupported for the intended target device of the 10 graphical program may include altering an appearance of one or more of the unsupported graphical program elements in the graphical program. For example, if the graphical program includes an unsupported node, then the node icon may be visually altered, e.g., by changing colors, highlighting or drawing a box around the node icon, or otherwise altering its appearance. Similarly, if the graphical program includes an unsupported wire, then the wire may be visually altered, e.g., by changing the appearance to that of a "broken" wire using dashed lines, changing the color of the wire, or otherwise altering its appearance.

In one embodiment, an invalid condition may be indicated for each unsupported graphical program element in the graphical program. For example, each of the unsupported graphical program elements may be visually altered to indicate the invalid condition, and/or text information for each of the unsupported graphical program elements may be displayed. Thus, where the graphical program includes multiple unsupported graphical program elements, multiple invalid conditions may be displayed. In another embodiment, only a single invalid condition may be indicated at a time, and the user may cycle through the problem elements.

Also, as described above, the method may check for semantic problems or semantic differences for graphical program elements or combinations of graphical program elements between the first computer system and the intended target device. Thus, in one embodiment, information indicating any such semantic problems or differences may be displayed.

In one embodiment, in addition to displaying the invalid condition(s), one or more suggestions for changing the graphical program may be displayed. For example, the suggestions may inform the user of how he can change the graphical program so that each element in the graphical program is supported for the intended target device. For example, a suggestion to substitute an unsupported node with a supported node or a combination of supported nodes may be displayed. The suggestions may also explain why particular elements are unsupported and may provide general information on strategies for writing graphical programs for the intended target device. In one embodiment, the graphical program may be automatically modified to fix one or more of the unsupported graphical program elements, e.g., by substituting other graphical program elements. The user may first be prompted to ask whether he wants the change to be made automatically.

In various embodiments, the elements of the above-described method may be performed at various times during the development process of a graphical program. For example, in one embodiment, the user may explicitly request to perform target device-specific syntax and/or semantic analysis for the graphical program. In response, the method may operate to check all of the elements in the graphical program for validity. In other embodiments, the target device-specific syntax and/or semantic analysis may be performed automatically or in response to other actions, such as a user request to compile the graphical program, or in response to the user selecting or changing the target device for the graphical program.

In one embodiment, the target device-specific syntax and/or semantic analysis may be performed as a cumulative process as the user creates the graphical program, rather than checking all of the elements in the graphical program together in a single process. For example, as each new graphical program element is added to the graphical program, the new element may immediately be checked to determine whether the element is supported for the currently selected target device. If the element is not supported, the user may receive immediate feedback alerting him of this.

In one embodiment, a user may desire to deploy a graphical program on two or more target devices, e.g., where each target device is a different kind of target device. For example, the user may desire to deploy the graphical program on both a personal digital assistant (PDA), and a device including a programmable hardware element such as an FPGA.

Thus, in one embodiment of the method, the user may be able to specify the two or more intended target devices for the graphical program. The method may then operate to programmatically analyze the graphical program to determine whether the graphical program can execute properly on each of the intended target devices, i.e., using techniques such as described above. If the graphical program cannot execute properly on one or more of the intended target devices, then an invalid condition may be indicated.

BRIEF DESCRIPTION OF THE DRAWINGS

A better understanding of the present invention can be obtained when the following detailed description of the preferred embodiment is considered in conjunction with the following drawings, in which.

Figure 1:
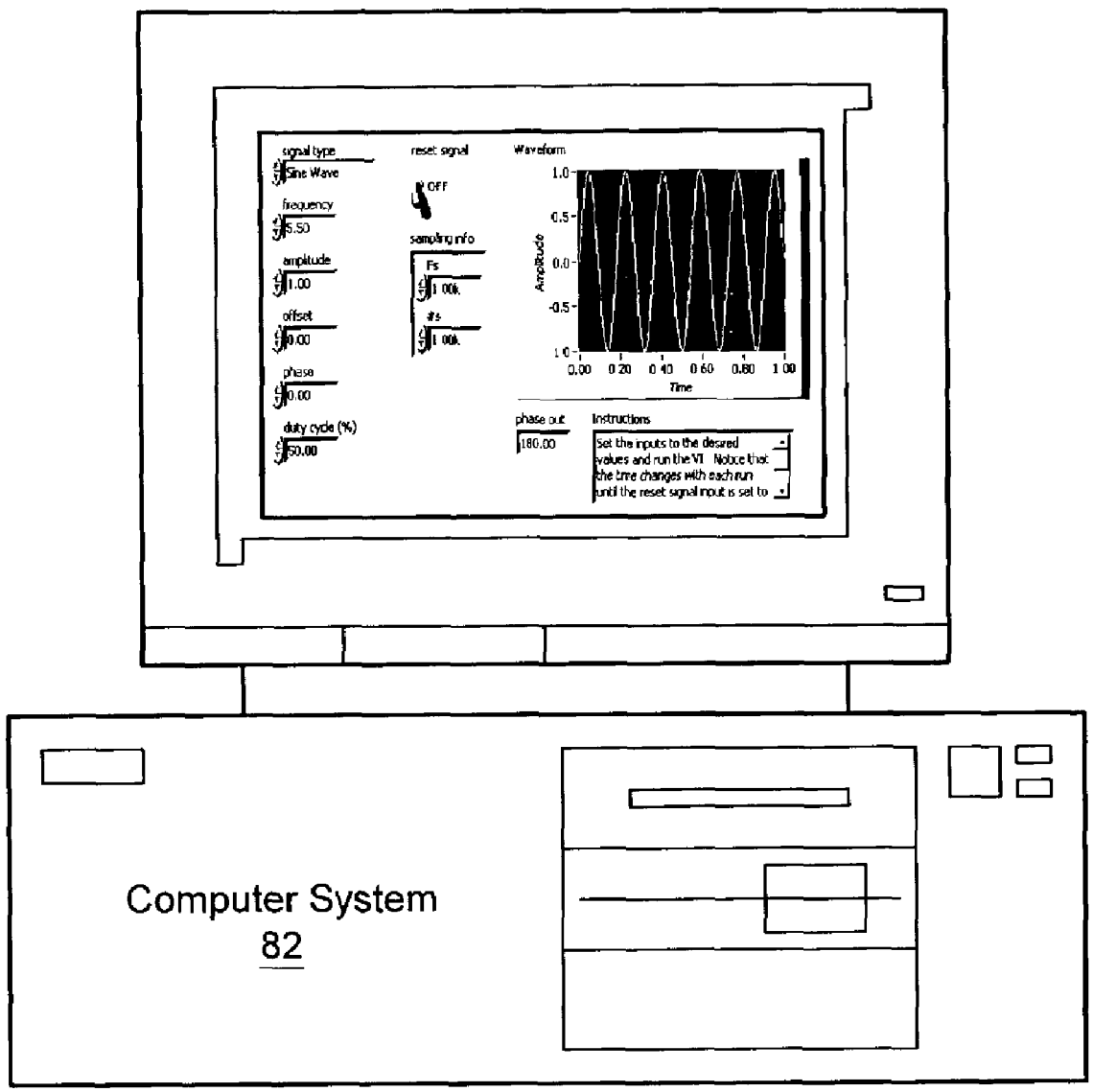
FIG. 1 illustrates a computer system operable to execute a graphical programming development environment, where the graphical programming development environment is operable to perform target device-specific syntax and/or semantic analysis for a graphical program based on a target device on which the graphical program is to be deployed.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. patent application Ser. No. 09/949,783 titled "System and Method for Deploying a Graphical Program on an Image Acquisition Device," filed Sep. 10, 2001.

U.S. patent application Ser. No. 09/974,601 titled "System and Method for Deploying a Graphical Program to a PDA Device," filed Oct. 9, 2001.

U.S. patent application Ser. No. 10/094,198 titled "Self-Determining Behavior Node for Use in Creating a Graphical Program," filed Mar. 8, 2002.

U.S. patent application Ser. No. 10/113,067 titled "Graphically Deploying Programs on Devices in a System," filed Apr. 1, 2002.

U.S. patent application Ser. No. 10/200,091 titled "System and Method for Automatically Porting a Prototype to an Embedded Device," filed Jul. 19, 2002.

U.S. patent application Ser. No. 10/174,347 titled "Filtering Graphical Program Elements Based on Configured or Targeted Resources," filed Jun. 18, 2002.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to execute a graphical programming development environment for creating a graphical program. For example, the graphical program may be developed on a first type of computer system using the graphical programming development environment. A user may desire to then deploy the graphical program on a second type of computer system or other device. As one example, the graphical program may be developed on a general purpose computer system, e.g., a personal computer system or desktop computer system, and the graphical program may then be deployed on one or more target devices.

According to one embodiment of the invention, the graphical programming development environment may be operable to perform target device-specific syntax and/or semantic analysis for a graphical program based on a target device on which the graphical program is to be deployed. Performing target device-specific syntax and/or semantic analysis may include programmatically analyzing the graphical program to determine whether the graphical program can execute on the respective target device or to determine potential problematic issues related to execution of the graphical program on the respective target device. As described in detail below, the graphical programming development environment may check or validate the graphical program, e.g., to inform the user whether the graphical program can execute (or can execute correctly) on the intended target device. For example, if the graphical program includes a particular graphical program element that is unsupported for the intended target device, then the graphical programming development environment may inform the user of this problem.

The computer system 82 may be any type of computer system, including a personal computer system, mainframe computer system, workstation, network appliance, Internet appliance, television system or other device. In general, the term "computer system" can be broadly defined to encompass any device having at least one processor that executes instructions from a memory medium.

Also, in various embodiments, the graphical program may be deployed on any of various kinds of target devices. A few examples of target devices include: a device including a programmable hardware element (e.g., an FPGA), a personal digital assistant (PDA), a device including a processor and a memory that stores a restricted version of a graphical program execution engine, etc.

As shown in FIG. 1, the computer system 82 may include a display device operable to display the graphical program, e.g., as the graphical program is being created. As described below, the display device may also be used to display information related to one or more problems found when analyzing the graphical program with respect to execution on the intended target device.

The computer system 82 may also include a memory medium(s) on which one or more computer programs or software components according to one embodiment of the present invention may be stored. For example, the memory medium may store a graphical programming development environment application which is operable to perform target device-specific syntax and/or semantic analysis. The memory medium may also or alternatively store one or more graphical programs created using the graphical programming development environment, e.g., where the graphical programs are intended for deployment on one or more target devices. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program including graphical code. The graphical code may be included in the graphical program in response to user input. For example, the graphical program may be created or assembled by the user arranging on a display a plurality of nodes or icons and then interconnecting the nodes to create the graphical program. The interconnected nodes or icons may visually indicate the functionality of the graphical program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons that visually indicate the functionality of the program.

A graphical program may also include a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

Figure 2A:
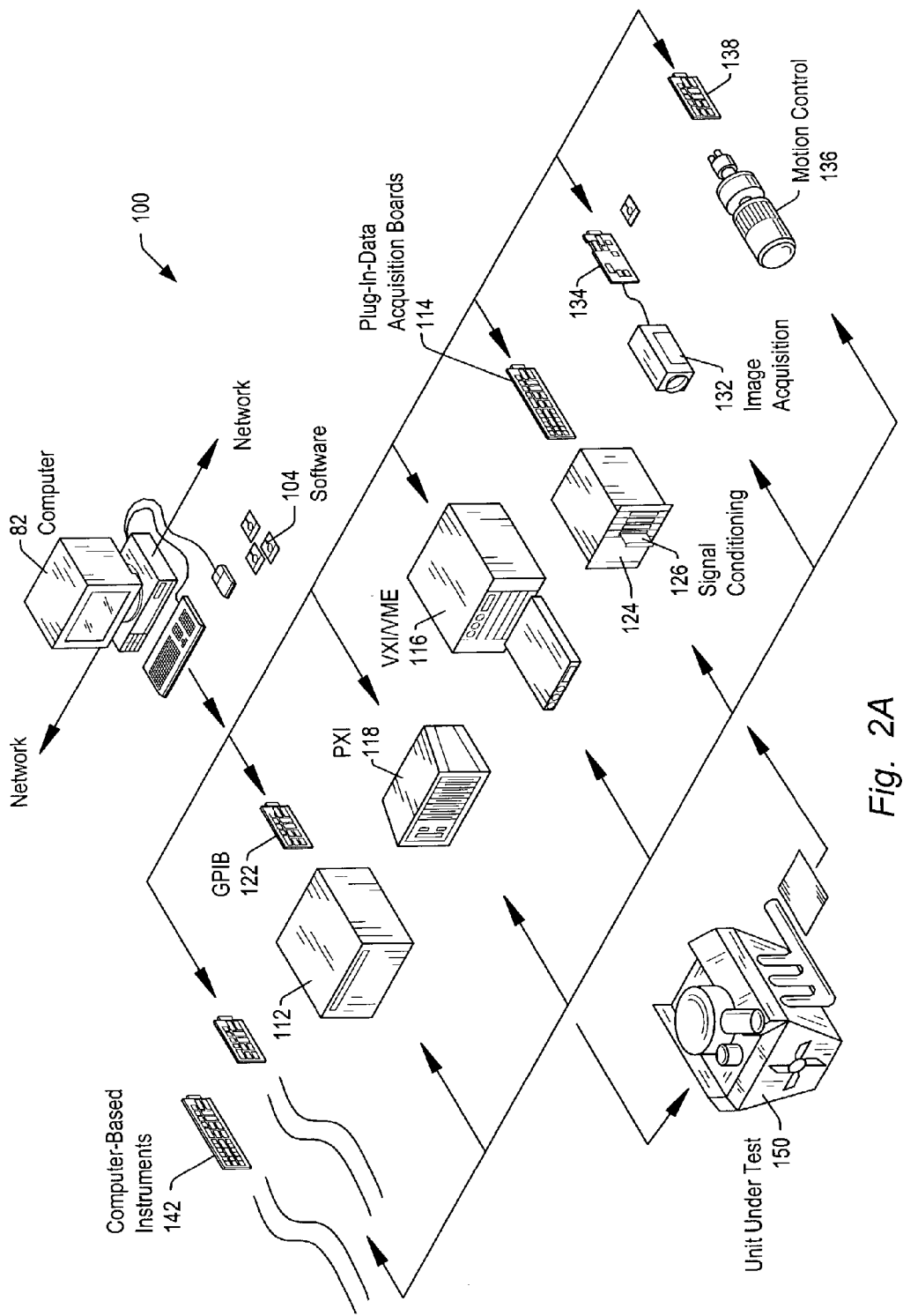
FIG. 2A illustrates an instrumentation control system according to one embodiment of the invention.
Figure 2B:
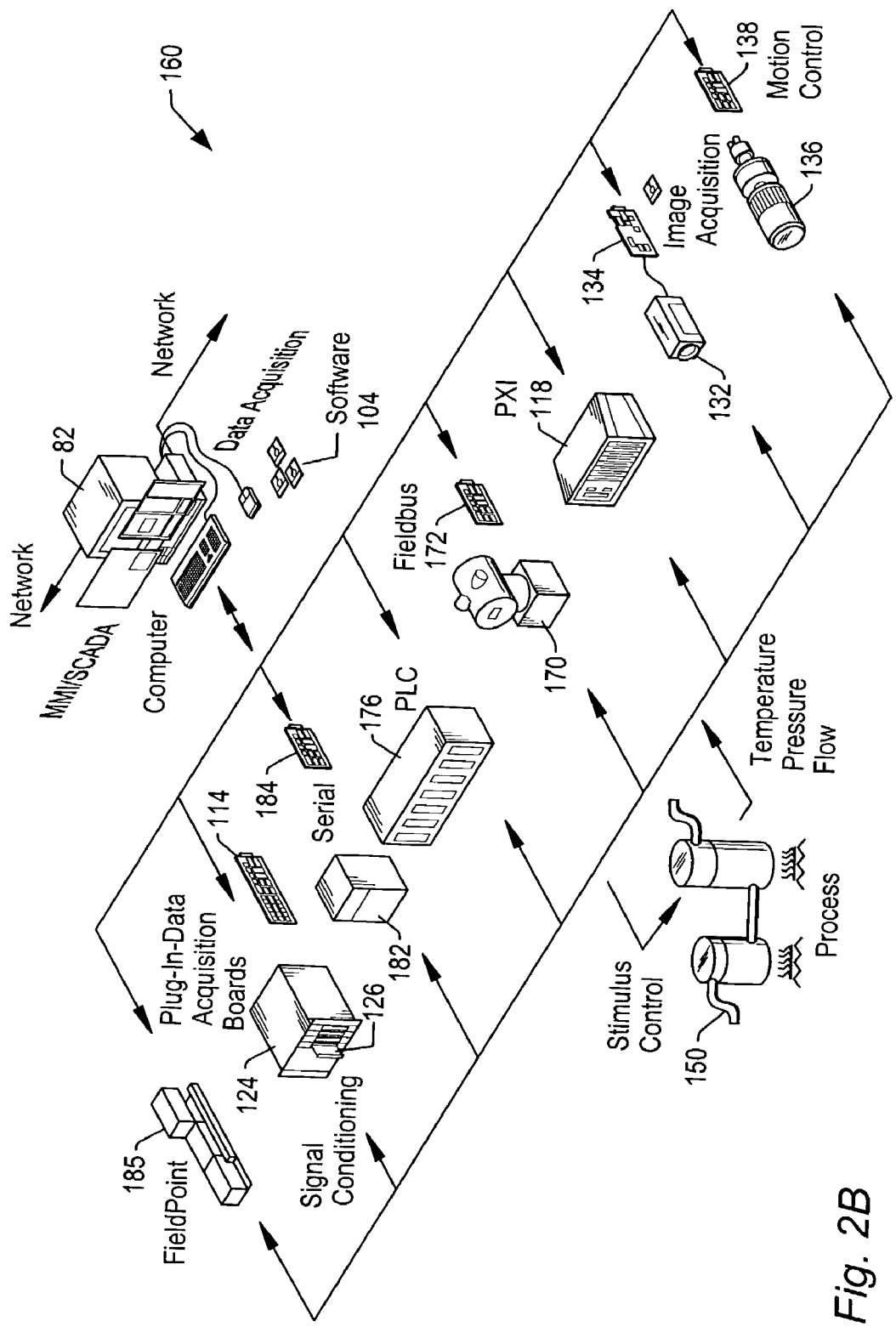
FIG. 2B illustrates an industrial automation system according to one embodiment of the invention.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and is not limited to instrumentation or industrial automation applications. In other words, the following description is exemplary only, and the present invention may be used in conjunction with any of various types of systems. Thus, embodiments of the present invention may be applied to any of various types of applications, including applications related to the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100 which may implement embodiments of the invention. The system 100 includes a host computer 82 which couples to one or more instruments or devices. The host computer 82 may include a CPU, a display screen, memory, and one or more input devices such as a mouse or keyboard as shown.

In one embodiment, a graphical program may be deployed on one of the instruments or devices coupled to the host computer 82. As described above, before the graphical program is deployed on the instrument or device, the graphical program may be programmatically analyzed to determine whether the graphical program can execute correctly on the instrument or device. In one embodiment, the computer system 82 may execute software to programmatically analyze the graphical program in this manner. For example, the graphical program may be developed on the computer system 82 before being deployed on the desired instrument or device. In another embodiment, the graphical program may be developed and/or programmatically analyzed on another computer system before being deployed on the desired instrument or device.

The instruments shown in FIG. 2A are exemplary only. In various embodiments, the graphical program may be deployed on any of various kinds of target devices or instruments. For example, the graphical program may be deployed on an instrument or device that includes a programmable hardware element, such as an FPGA, or a device or instrument that includes a processor and memory. As one example, the device or instrument may execute the graphical program to analyze, measure, or control a unit under test (UUT) or process 150.

It is noted that the devices or instruments shown in FIG. 2A may couple to the computer system 82 in any of various ways. For example, the devices or instruments may couple directly to the computer system 82, e.g., through a bus or cable, or may couple to the computer system 82 via a network, such as a LAN, WAN, the Internet, or a wireless network, among other ways.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or a machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may include a computer 82 which couples to one or more devices or instruments. Similarly as described above, in one embodiment, a graphical program may be deployed on one of the instruments or devices coupled to the computer 82. As described above, before the graphical program is deployed on the instrument or device, the graphical program may be programmatically analyzed to determine whether the graphical program can execute correctly on the instrument or device.

The computer 82 may include a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as Fieldpoint system 185, available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" may include acquisition and/or processing of an image. A graphical program may be created that implements a measurement function. For example, the graphical program may be used to acquire a signal and perform the measurement function on the acquired signal.

In the embodiments of FIGS. 2A and 2B above, one or more of the various instruments may couple to the computer 82 over a network, such as the Internet. In one embodiment, the user may operate to select a target instrument or device from a plurality of possible target devices for programming or configuration. Thus the user may create or deploy a graphical program on a computer and use the graphical program in conjunction with a target device or instrument that is remotely located from the computer and coupled to the computer through a network.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
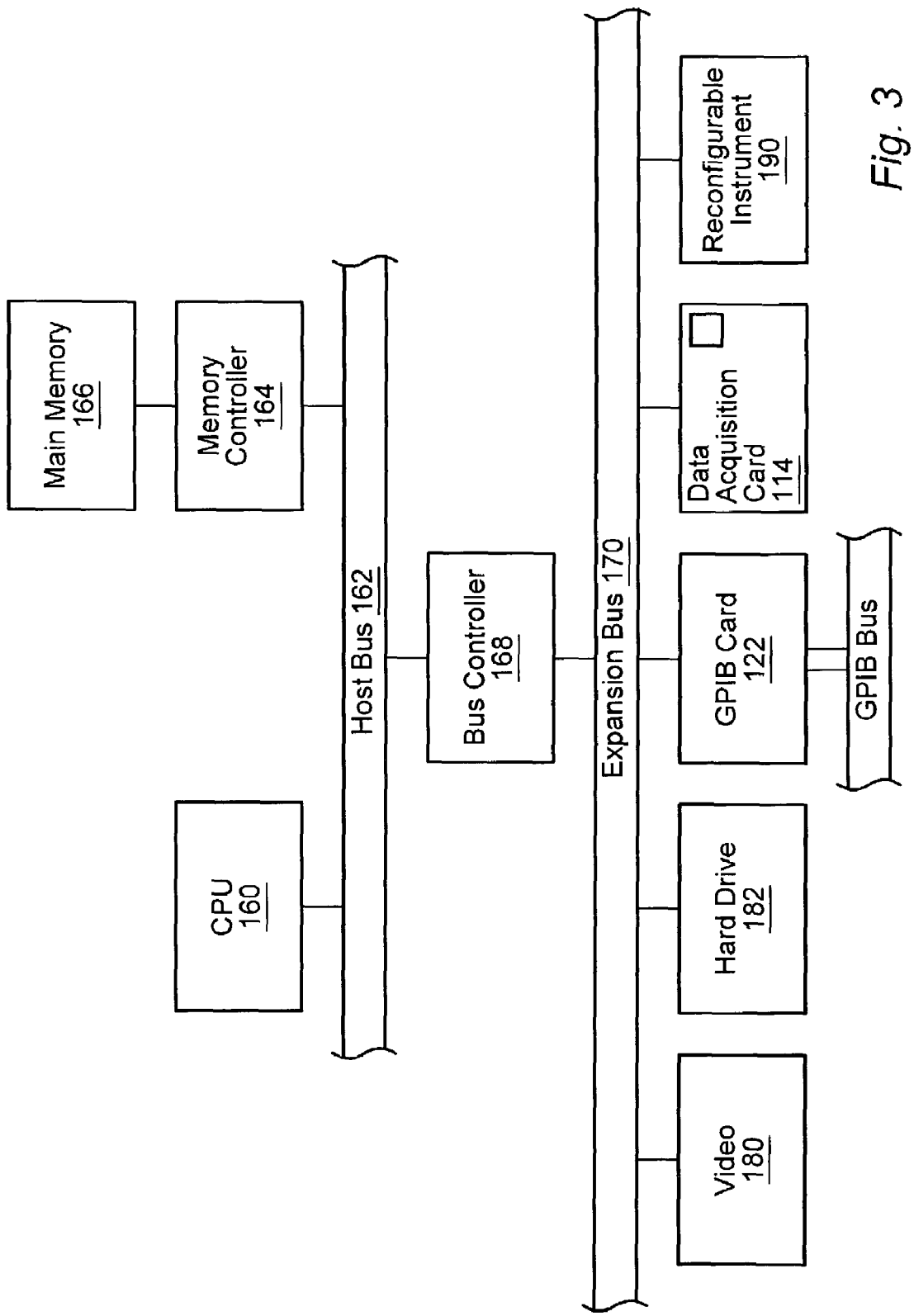
FIG. 3 is a block diagram representing one embodiment of the computer system illustrated in FIGS. 1, 2A, and/or 2B.

FIG. 3—Computer System Block Diagram

FIG. 3 is a block diagram representing one embodiment of the computer system 82 illustrated in FIGS. 1, 2A, and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software elements such as described above with reference to FIG. 1 and may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

As shown, in one embodiment, a reconfigurable instrument 190 may also be connected to the computer. The reconfigurable instrument 190 may include configurable logic, such as a programmable logic device, e.g., an FPGA, or a processor and memory, which may execute a real time operating system. According to one embodiment, a created graphical program may be deployed on the reconfigurable instrument 190. For example, a graphical programming development environment with which the graphical program is associated may provide support for configuring the reconfigurable instrument 190 to execute at least a portion of the graphical program. In various embodiments, the configurable logic may be comprised on an instrument or device connected to the computer through means other than an expansion slot, e.g., the instrument or device may be connected via an IEEE 1394 bus, USB, or other type of port, or may be connected via a network. Also, the configurable logic may be comprised on a device such as the data acquisition board 114 or another device shown in FIG. 2A or 2B.

Figures 4, 5:
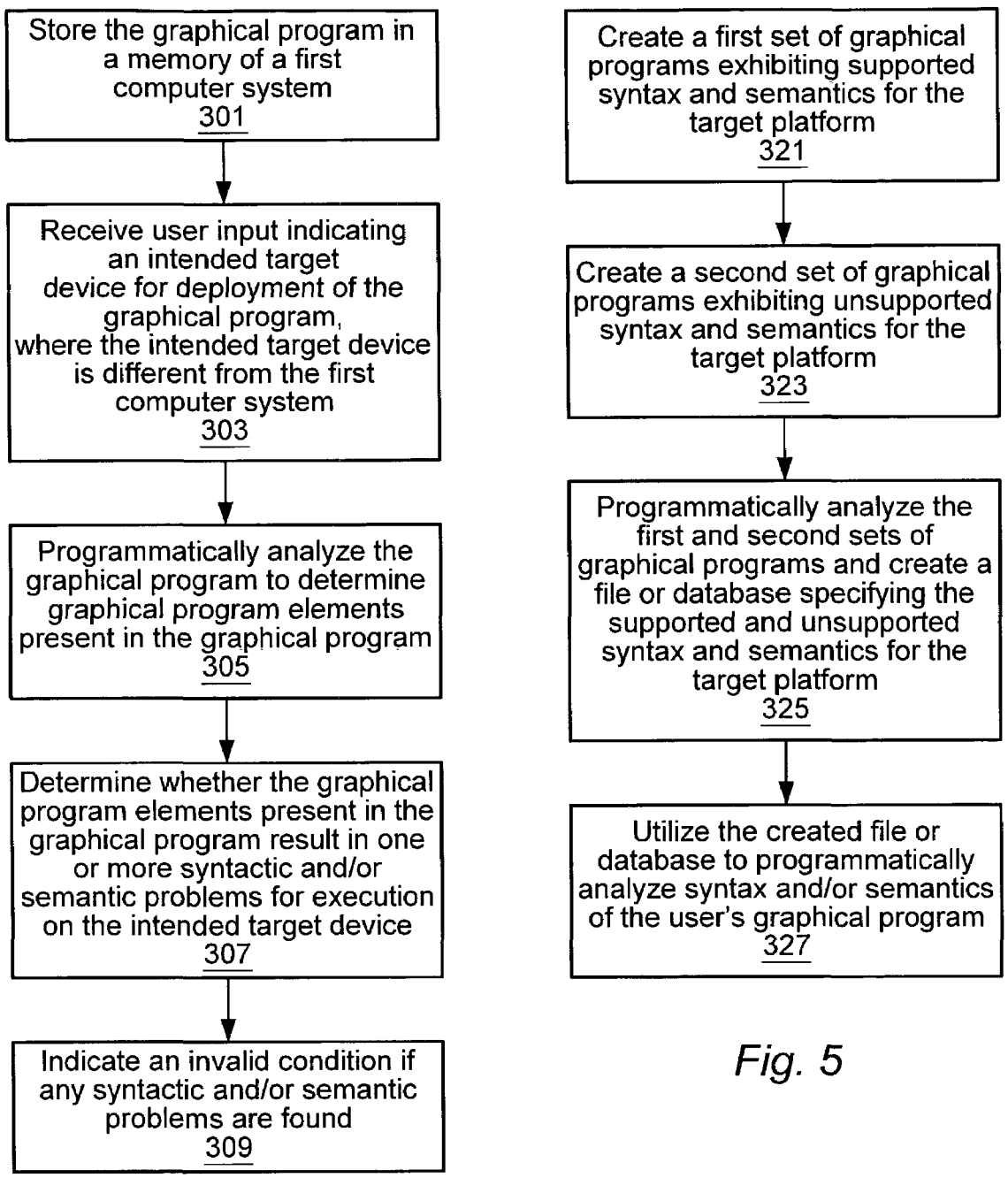
FIG. 4 is a flowchart diagram illustrating one embodiment of a method for performing target device-specific syntax and/or semantic analysis for a graphical program.
FIG. 5 illustrates one embodiment of a method for automatically creating verification information to be used in analyzing the syntax and/or semantics of a graphical program with respect to a particular target platform.

FIG. 4—Target Device-Specific Syntax and/or Semantic Analysis

FIG. 4 is a flowchart diagram illustrating one embodiment of a method for performing target device-specific syntax and/or semantic analysis for a graphical program. It is noted that FIG. 4 illustrates a representative embodiment, and alternative embodiments are contemplated. Also, various elements may be combined, omitted, or performed in different orders.

In 301, the graphical program may be stored in a memory. For example, the graphical program may be stored in a memory of a first computer system which executes a graphical programming development environment for developing and/or analyzing the graphical program. Storing the graphical program in the memory may include storing one or more data structures representing the graphical program in the memory and/or storing program instructions for the graphical program in the memory.

In 303, user input indicating an intended target device for deployment of the graphical program may be received. For example, the user input may be received to a graphical programming development environment application used to develop the graphical program. The graphical programming development environment may allow the user to select from a plurality of target devices for deployment of the graphical program. The intended target device may be a different kind of device than the first computer system in which the graphical program is stored or analyzed.

In various embodiments, the user may be able to select any of various kinds of target devices for deployment of the graphical program. As one example, the available target devices may include FPGA devices or devices including other types of programmable hardware elements. The user may also be able to select specific FPGA models or products. For example, the syntax and/or semantic analysis performed on the graphical program may be different for different FPGA devices, since the different devices may have different numbers or types of available resources.

As another example, the available target devices may include personal digital assistant (PDA) devices. The user may also be able to select specific PDA brands or models. For example, the syntax and/or semantic analysis performed on the graphical program may be different for different PDA devices, e.g., since different graphical program elements may be supported for different PDA devices.

As another example, the available target devices may include one or more devices including a processor and memory, e.g., where the memory stores a restricted version of a graphical program execution engine. For example, such devices may include devices intended for use in a real-time system. The graphical program may be stored on the device, and the processor may execute the restricted version of the graphical program execution engine to manage the execution of the graphical program.

As another example, the available target devices may include one or more devices which execute a different operating system than the first computer system in which the graphical program is stored or analyzed. In this example, the intended target device may or may not include different hardware than the first computer system. As one example, the graphical program may be stored in a personal computer system executing the Windows operating system and may be analyzed by this computer system, e.g., as described below. The intended target device could be an identical computer system executing a Linux operating system. For example, different graphical program elements may be supported for these two operating systems. As another example, the intended target device could be a computer system executing a Macintosh operating system.

The available target devices for selection may include devices that are not connected to the computer system performing the analysis of the graphical program. Thus, the graphical program may be developed offline from its intended target device, but may still be analyzed for syntax and/or semantics with respect to the intended target device. For example, the user may utilize a general purpose computer system executing the Windows operating system to develop the graphical program and check whether the graphical program can execute correctly on a target FPGA device, even if the target FPGA device is not coupled to the general purpose computer system.

In one embodiment, the syntax and/or semantic analysis may also be performed on the basis of I/O resources present on the target device.

Figure 6:
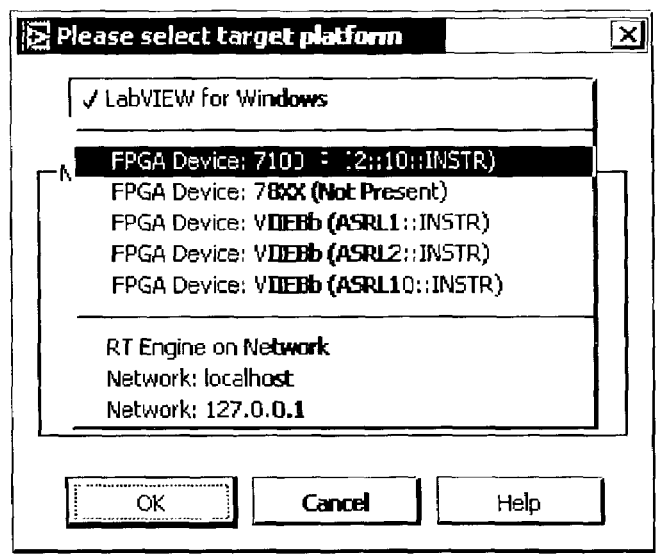
FIG. 6 illustrates an exemplary user interface dialog box that enables a user to select an intended target device for a graphical program.

In one embodiment, a graphical user interface indicating available target devices for deployment of the graphical program may be displayed. Thus, 303 may involve receiving user input indicating the intended target device for deployment of the graphical program to this graphical user interface. FIG. 6 illustrates an exemplary graphical user interface for selecting the target device. In this example, five different FPGA devices are available for selection, as well as other potential targets.

In other embodiments, the intended target device may be specified in any of various other ways. For example, in one embodiment, a program icon representing the graphical program may be graphically associated with a device icon representing the target device in response to user input. For example, the user may drag and drop the program icon onto the device icon.

In 305, the graphical program may be programmatically analyzed to determine graphical program elements present in the graphical program. Programmatically analyzing the graphical program may include any technique or method implemented by a program that inspects or examines the graphical program to determine graphical program elements present in the graphical program. Programmatically analyzing the graphical program may include programmatically analyzing the one or more data structures representing the graphical program in the memory to determine graphical program elements present in the graphical program.

The term "graphical program element" may include any of various elements or objects included in a graphical program. For example, graphical program elements may include nodes in the graphical program. As described above, the graphical program may include a plurality of interconnected nodes. A graphical programming development environment may provide various types of nodes for inclusion in a graphical program. For example, the available nodes may include primitive nodes or function nodes operable to perform various functions or processes. The available nodes may also include sub-program nodes that have an associated block diagram or sub-program.

Graphical program elements in the graphical program may also include wires, such as wires or lines that connect various nodes together. Graphical program elements may also include various data types. A particular data type may be included in the graphical program if the graphical program utilizes data of that data type. For example, an input or output of a node in the graphical program may have an associated data type. Thus, for example, if the graphical program includes a first node having an output terminal of a first data type, and a wire connects the output terminal of the first node to an input terminal of a second node, then the first data type may be said to be included in the graphical program. Also, with respect to data types it is noted that in one embodiment, the graphical program may be polymorphic in nature. For example, a data type in the graphical program may be a double data type when targeted for a device executing the Windows operating system and may be a fixed point data type when targeted for an FPGA device. Thus, the application may be able to execute correctly on both devices.

Graphical program elements may also include programming structures such as loop structures, case structures, sequence structures, event structures, etc., as well as various program constructs. Graphical program elements may also include various interfaces, such as a communication interface. Graphical program elements may also include user interface elements, such as controls and indicators for providing input to and/or displaying output from the graphical program.

In 307, the method may operate to determine whether the graphical program elements present in the graphical program result in one or more syntactic and/or semantic problems for execution on the intended target device. In various embodiments, the method may check for any of various kinds of syntactic and/or semantic problems.

In one embodiment, 307 may comprise determining whether any of the graphical program elements in the graphical program are unsupported for the intended target device of the graphical program. In another embodiment, the method may operate to determine whether any combination of the graphical program elements is unsupported for the intended target device of the graphical program.

As used herein, a graphical program element may be unsupported for the intended target device if one or more of the following apply: if a graphical program cannot be deployed on the intended target device when the graphical program includes the graphical program element; if a graphical program cannot execute on the intended target device when the graphical program includes the graphical program element; and/or if the presence of the graphical program element in a graphical program may cause the graphical program to fail or execute incorrectly on the intended target device. For example, consider a case in which the graphical program is developed on a general purpose computer system and the graphical program includes a first node operable to perform an input/output function. The first node may be unsupported for the intended target device if the particular input/output function cannot be performed on the intended target device. The graphical program element may also be unsupported for the intended target device if one or more of the above conditions apply based on the I/O resources of the intended target device.

In various embodiments, any of various techniques may be used to determine whether any of the graphical program elements in the graphical program are unsupported for the intended target device of the graphical program. In one embodiment, this determination may involve determining or accessing a set of supported graphical program elements for the intended target device and determining whether any of the graphical program elements are not in the set of supported graphical program elements for the intended target device. For example, for each of the graphical program elements in the graphical program, the method may operate to determine whether the respective graphical program element is in a set of supported graphical program elements for the intended target device. In another embodiment, the method may determine whether any of the graphical program elements (or any combination of graphical program elements) in the graphical program are in a set of unsupported graphical program elements (or unsupported combinations) for the intended target device. Information specifying supported or unsupported elements for a graphical program is also referred to herein as verification information.

In one embodiment, the method may operate to programmatically query the target device to determine software resident on the target device, e.g., the type of a graphical program execution engine, the type of operating system, etc. This information may also be used in determining whether any of the graphical program elements in the graphical program are unsupported. For example, certain graphical program elements may be supported in newer versions of the software but may be unsupported in older versions, or certain graphical program elements may be supported in certain operating systems but not others, etc.

In one embodiment, 307 may comprise determining whether any of the graphical elements in the graphical program are used in an unsupported manner for the intended target device. For example, each of the graphical program elements may itself be supported for the intended target device. However, the way in which one or more of the graphical program elements are used may not be supported. Thus, in various embodiments, 307 may comprise analyzing the semantics of the graphical program as well as the syntax. Semantics for combinations of graphical program elements may be analyzed, as well as semantics for individual graphical program elements. Similarly as described above, verification information which describes supported and/or unsupported uses of graphical program elements may be utilized in determining whether the semantics of the graphical program are valid or invalid for the intended target device.

In one embodiment, the method may be operable to analyze the graphical program to determine whether the graphical program utilizes particular programming construct patterns that are unsupported for the intended target device. As one example, for the LabVIEW graphical programming development environment, graphical programs that execute on a general purpose computer system may utilize references that are dynamic, e.g., the references may be swapped out and interchanged at runtime. However, such dynamic references are not currently supported for graphical programs that execute on an FPFA device. Thus, an embodiment of the method for analyzing LabVIEW programs may perform a check for interchanged references in the graphical program if the intended target device is an FPGA device.

The above example also illustrates that the types of syntactic and/or semantic problems that the method checks for in 307 may depend on the type of target device. For example, if the selected target device supports dynamic references, then the method may not analyze the graphical program to determine whether the graphical program utilizes interchanged references.

In one embodiment, the method may be operable to analyze the graphical program to determine whether the meaning or semantics of any of the graphical program elements in the graphical program are different on the intended target device than the meaning or semantics on the first computer system which stores or analyzes the graphical program. For example, each of the graphical program elements may be supported, and the graphical program elements may be used in a manner supported for the intended target device, but the semantics or program behavior of one or more of the graphical program elements may be different on the target device. As described below, the user may be informed of this semantic difference. Also, in addition to checking for semantic differences in individual graphical program elements, the method may check for semantic differences for combinations of graphical program elements or programming constructs utilized in the graphical program.

In 309, an invalid condition may be indicated if any syntactic and/or semantic problems were found in 307. For example, an invalid condition may be indicated if any of the graphical program elements (or any combination of graphical program elements) in the graphical program are unsupported for the intended target device of the graphical program. In various embodiments, the invalid condition may be indicated in any of various ways. In one embodiment, indicating the invalid condition may include displaying information to indicate that one or more of the graphical program elements are unsupported. For example, text information to indicate that one or more of the graphical program elements are unsupported may be displayed. For example, a list of error messages related to the unsupported graphical program elements may be displayed.

In another embodiment, information may be displayed to indicate that one or more of the graphical program elements are unsupported for the intended target device of the graphical program by altering an appearance of one or more of the unsupported graphical program elements in the graphical program. For example, if the graphical program includes an unsupported node, then the node icon may be visually altered, e.g., by changing colors, highlighting or drawing a box around the node icon, or otherwise altering its appearance. Similarly, if the graphical program includes an unsupported wire, then the wire may be visually altered, e.g., by changing the appearance to that of a "broken" wire using dashed lines, changing the color of the wire, or otherwise altering its appearance.

In one embodiment, an invalid condition may be indicated for each unsupported graphical program element in the graphical program. For example, each of the unsupported graphical program elements may be visually altered to indicate the invalid condition, and/or text information for each of the unsupported graphical program elements may be displayed. Thus, where the graphical program includes multiple unsupported graphical program elements, multiple invalid conditions may be displayed.

Also, as described above, the method may check for semantic differences for graphical program elements or combinations of graphical program elements between the first computer system and the intended target device. Thus, in one embodiment, information indicating any such semantic differences may be displayed in 309. For example, a text warning informing the user of the semantic difference may be displayed. This information may help a user who is unfamiliar with the semantics for the intended target device.

In one embodiment, in addition to displaying the invalid condition(s), one or more suggestions for changing the graphical program may be displayed. For example, in one embodiment the suggestions may inform the user of how he can change the graphical program so that each element in the graphical program is supported for the intended target device. For example, a suggestion to substitute an unsupported node with a supported node or a combination of supported nodes may be displayed. The suggestions may also explain why the particular elements are unsupported and may provide general information on strategies for writing graphical programs for the intended target device. Similarly, if any of the graphical elements in the graphical program are used in an unsupported manner for the intended target device, a suggestion for changing the graphical program may be displayed.

In one embodiment, the graphical program may be automatically modified to fix one or more of the unsupported graphical program elements, e.g., by substituting other graphical program elements. The user may first be prompted to ask whether he wants the change to be made automatically.

In one embodiment, if any problems are found in the graphical program, then the problems may be indicated as described above, and an edit-time error may be produced. The edit time error may prevent the graphical program from being executed on the target device. For example, for a graphical programming development environment in which graphical programs are compiled, the graphical program may not be compiled until the user corrects the error. In another embodiment, the problems may be indicated, but an edit-time warning may be produced instead of an edit-time error. Thus, the graphical program may still be executed on the target device. However, the graphical program may not execute correctly, or a run-time error may be produced, e.g., if the portion of the graphical program containing the problem is executed. For various reasons, it may be desirable to allow the graphical program to execute on the target device even if problems are present. For example, the user may be aware that a portion of the graphical program will not execute correctly but may still desire to test another portion of the graphical program.

In various embodiments, the elements of the above-described method may be performed at various times during the development process of a graphical program. For example, in one embodiment, the user may explicitly request to perform target device-specific syntax and/or semantic analysis for the graphical program. In response, the method may operate to check all of the elements in the graphical program for validity. In other embodiments, the target device-specific syntax and/or semantic analysis may be performed automatically or in response to other actions, such as a user request to compile the graphical program, or in response to the user changing the target device for the graphical program.

In one embodiment, the target device-specific syntax and/or semantic analysis may be performed as a cumulative process as the user creates the graphical program, rather than checking all of the elements in the graphical program together in a single process. For example, as each new graphical program element is added to the graphical program, the new element may immediately be checked to determine whether the element is supported for the currently selected target device. If the element is not supported, the user may receive immediate feedback alerting him of this.

Also, in one embodiment, information regarding the results of the graphical program analysis may be stored, e.g., may be stored together with the graphical program. Thus, for example, if the graphical program is analyzed and no problems are found, information indicating this may be persistently stored. If the graphical program is later re-opened then the method may operate to retrieve the information and may determine that the graphical program does not need to be re-analyzed. If the user edits the graphical program, the graphical programming development environment may track changes to the graphical program to determine whether the information from the previous analysis is still valid. For example, if the user makes significant changes to the graphical program, then the information may be indicated as no longer valid.

Analyzing a Graphical Program for Deployment in Multiple Target Devices

In one embodiment, a user may desire to deploy a graphical program on two or more target devices, e.g., where each target device is a different kind of target device. For example, the user may desire to deploy the graphical program on both a personal digital assistant (PDA), and a device including a programmable hardware element such as an FPGA.

Thus, in one embodiment of the method, the user may be able to specify the two or more intended target devices for the graphical program. The method may then operate to programmatically analyze the graphical program to determine whether the graphical program can execute properly on each of the intended target devices, i.e., using techniques such as described above. If the graphical program cannot execute properly on one or more of the intended target devices, then an invalid condition may be indicated.

As described above, in one embodiment, information regarding the results of the graphical program analysis may be stored. Where the graphical program has been analyzed for multiple target devices, information regarding the analysis for each target device may be stored. Also, in one embodiment, compiled executable code for multiple target devices may be stored together.

FIG. 5—Method for Creating Verification Information

As described above, in performing the analysis of the graphical program, verification information may be utilized to determine whether the syntax and/or semantics of the graphical program are supported for the intended target device. In various embodiments, the verification information may include any kind of information or data and may be organized or structured in any way. The verification information may also be stored in any way, such as in one or more files (e.g., text files, XML files, etc.) or databases.

The verification information may also be created using any desired technique. In one embodiment, the verification information may be created manually. In another embodiment, the verification information may be created automatically, i.e., as output from a computer program. FIG. 5 illustrates one embodiment of a method for automatically creating verification information to be used in analyzing the syntax and/or semantics of a graphical program with respect to a particular target platform.

In 321, a first set (one or more) of graphical programs exhibiting supported syntax and semantics for the target platform may be created, e.g., may be created by a user or may be programmatically created. For example, the first set of graphical programs may include graphical programs which are valid for the target platform and include each supported graphical program element for the target platform. The first set of graphical programs may also demonstrate supported combinations of graphical program elements for the target platform. The first set of graphical programs may also demonstrate supported semantics and programming constructs for the target platform.

In 323, a second set (one or more) of graphical programs exhibiting unsupported syntax and semantics for the target platform may be created, e.g., may be created by a user or may be programmatically created. For example, the second set of graphical programs may include graphical programs which are invalid for the target platform and include unsupported graphical program elements for the target platform. The second set of graphical programs may also demonstrate unsupported combinations of graphical program elements for the target platform. The second set of graphical programs may also demonstrate unsupported semantics and programming constructs for the target platform.

In 325, the first and second sets of graphical programs may be programmatically analyzed, and the verification information may be programmatically created based on the results of this analysis. For example, a computer program may execute to analyze the first set of graphical programs to create information (verification information) describing supported syntax and/or semantics for the target platform. Similarly, the computer program (or another program) may execute to analyze the second set of graphical programs to create information (verification information) describing unsupported syntax and/or semantics for the target platform. As noted above, the verification information may be stored in any way, such as in one or more files or databases. In one embodiment, the verification information may be stored as one or more XML files. In one embodiment, the XML files may be further parsed into other data structures specifying supported/unsupported syntax/semantics for the target platform.

As indicated in 327 and described above with reference to FIG. 4, the verification information may then be used to programmatically analyze syntax and/or semantics of a user's graphical program.

The method of FIG. 5 may enable the syntax and/or semantic analysis to be easily extended, e.g., to specify supported or unsupported syntax/semantics for a new target platform for which no verification information currently exists, or to refine existing verification information for a particular target platform. As one example, to add a new graphical program element to the set of unsupported graphical program elements, a new graphical program including the element may be added to the second set of graphical programs, or an existing graphical program in the second set may be edited to include the element, and the verification information may then be automatically re-created or modified. In one embodiment, the mechanism for creating/modifying the verification information may be exposed to the user to enable the user to customize the syntax/semantics analysis as desired.

FIGS. 6–9: Examples

FIG. 6 illustrates an exemplary user interface dialog box that enables the user to select an intended target device for a graphical program. The checkmark indicates the currently selected target. As shown, a computer system executing the LabVIEW graphical programming development environment under the Windows operating system is currently selected. Other available target devices include a variety of FPGA devices, as well as a target device executing the LabVIEW RT graphical program execution engine.

Figure 7:
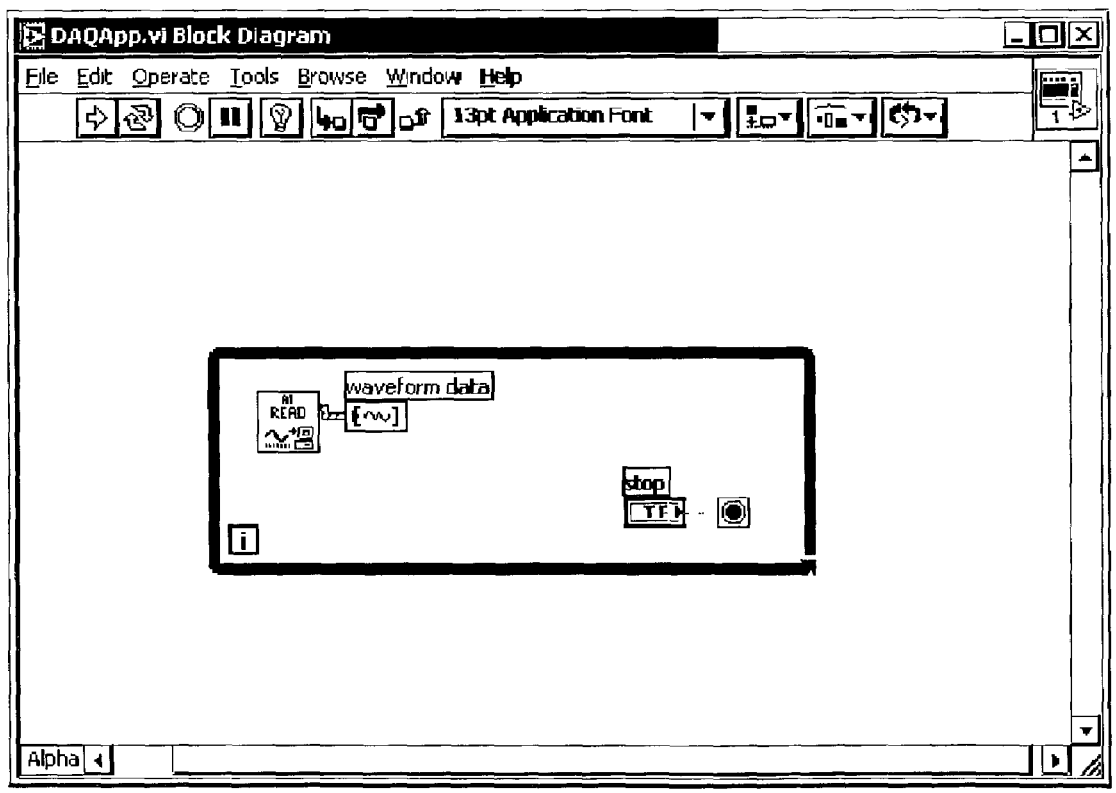
FIG. 7 illustrates a simple graphical program example having a normal appearance.

FIG. 7 illustrates a simple graphical program example. In FIG. 7, the graphical program has a normal appearance. In other words, each of the elements in the graphical program is supported for the currently selected target device, and thus, no invalid conditions are indicated.

Figure 8:
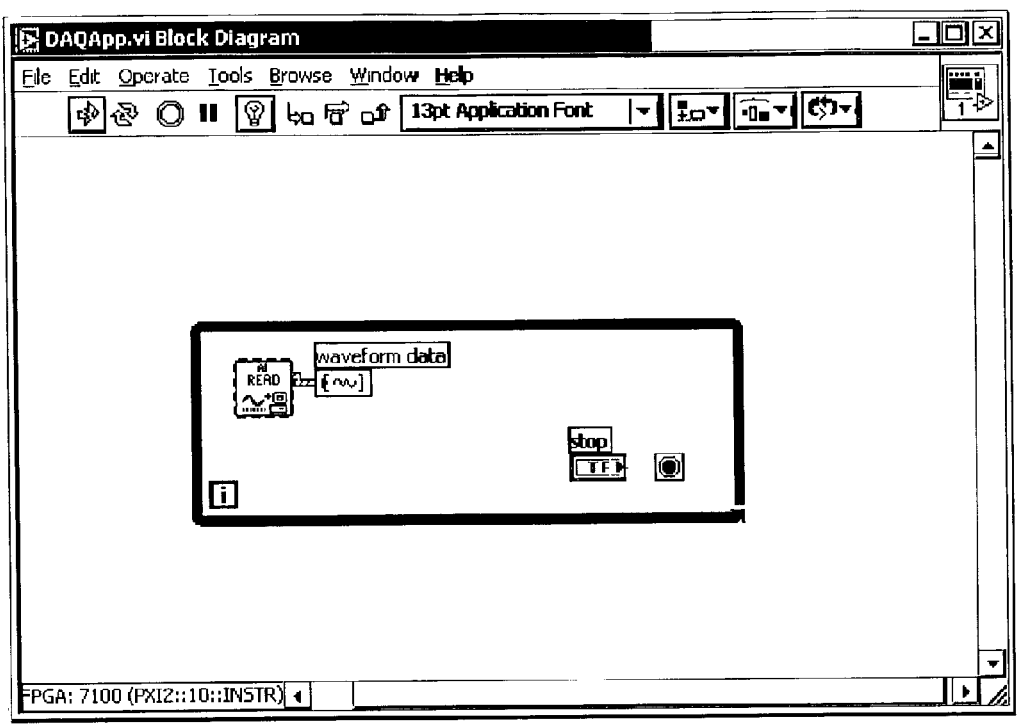
FIG. 8 illustrates the graphical program of FIG. 7, where an invalid condition is indicated for a node in the graphical program that is unsupported for the target device of the graphical program.

FIG. 8 illustrates the same graphical program as FIG. 7. In FIG. 8, however, an invalid condition is indicated for the "AI Read" node, a node that reads analog input data. In this example, the invalid condition is indicated by highlighting the node with dashed lines around its edges to draw the user's attention to the problem. The "AI Read" node may be unsupported, for example, if an FPGA target device is currently selected, where the FPGA device cannot perform the analog input function designated by the node.

Figure 9:
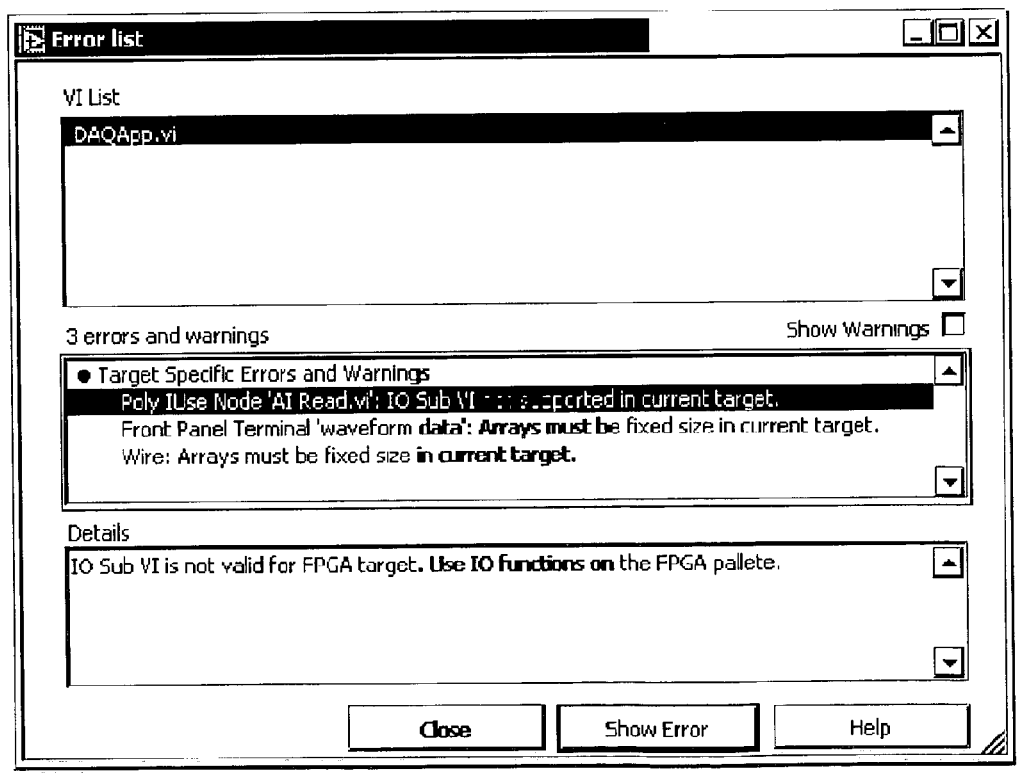
FIG. 9 illustrates a list of error/warning messages displayed along with the graphical program of FIG. 8.

FIG. 9 illustrates a list of error/warning messages that may also be displayed along with the graphical program of FIG. 8. The messages include a message informing the user that the "AI Read" node is not supported for the currently selected target device. For each error/warning message, the user may click on the message to view additional details regarding the error/warning. In FIG. 9, the details for the currently selected message inform the user of other function nodes that may be used to replace the unsupported "AI Read" node.

Clicking on the various error/warning messages in FIG. 9 may also highlight the respective problem element in the graphical program. For example, if the user clicks on the second error message regarding the "waveform data" front panel terminal, the graphical program displayed in FIG. 8 may change so that the "AI Read" node is no longer highlighted, and the "waveform data" front panel terminal is instead highlighted. In another embodiment, multiple problem elements in the graphical program may be highlighted at the same time.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for analyzing a graphical program, the method comprising:
   storing the graphical program in a memory, wherein the graphical program includes graphical code comprising a plurality of interconnected nodes that visually indicate functionality of the graphical program;
   programmatically analyzing the graphical program to determine graphical program elements present in the graphical program;
   programmatically determining whether any of the graphical program elements are unsupported for an intended target device of the graphical program; and
   indicating an invalid condition if any of the graphical program elements are unsupported for the intended target device of the graphical program.

2. The method of claim 1,
   wherein said storing the graphical program in a memory comprises storing the graphical program in a memory of a first computer system;
   wherein said analyzing, determining and indicating are performed by the first computer system;
   wherein the intended target device is different from the first computer system.

3. The method of claim 2,
   wherein the intended target device is not connected to the first computer system.

4. The method of claim 3, further comprising:
   programmatically modifying the graphical program so that each graphical program element in the graphical program is supported for the intended target device of the graphical program.

5. The method of claim 1,
   wherein said pro grammatically determining whether any of the graphical program elements are unsupported for the intended target device of the graphical program comprises:
   programmatically determining a set of supported graphical program elements for the intended target device; and
   programmatically determining whether any of the graphical program elements are not in the set of supported graphical program elements for the intended target device.

6. The method of claim 1,
   wherein said programmatically determining whether any of the graphical program elements are unsupported for the intended target device of the graphical program comprises:
   for each of the graphical program elements, programmatically determining whether the respective graphical program element is in a set of supported graphical program elements for the intended target device.

7. The method of claim 1,
   wherein said programmatically determining whether any of the graphical program elements are unsupported for the intended target device of the graphical program comprises:
   for each of the graphical program elements, programmatically determining whether the respective graphical program element is in a set of unsupported graphical program elements for the intended target device.

8. The method of claim 1,
   wherein said programmatically analyzing the graphical program comprises programmatically determining one or more nodes present in the graphical program;
   wherein said indicating an invalid condition comprises indicating an invalid condition if any of the nodes are unsupported for the intended target device of the graphical program.

9. The method of claim 1,
   wherein said programmatically analyzing the graphical program comprises programmatically determining one or more data types used in the graphical program;
   wherein said indicating an invalid condition comprises indicating an invalid condition if any of the data types are unsupported for the intended target device of the graphical program.

10. The method of claim 1,
    wherein said programmatically analyzing the graphical program comprises programmatically determining one or more wires used in the graphical program;
    wherein said indicating an invalid condition comprises indicating an invalid condition if any of the wires are unsupported for the intended target device of the graphical program.

11. The method of claim 1,
    wherein said programmatically analyzing the graphical program comprises programmatically determining one or more programming structures used in the graphical program;
    wherein said indicating an invalid condition comprises indicating an invalid condition if any of the programming structures are unsupported for the intended target device of the graphical program.

12. The method of claim 1,
wherein said programmatically analyzing the graphical program comprises programmatically determining one or more user interface elements used in the graphical program;
wherein said indicating an invalid condition comprises indicating an invalid condition if any of the user interface elements are unsupported for the intended target device of the graphical program.

13. The method of claim 1,
wherein said programmatically determining whether any of the graphical program elements are unsupported for the intended target device of the graphical program comprises programmatically determining that a first graphical program element and a second graphical program element are unsupported for the intended target device of the graphical program;
wherein said indicating an invalid condition if any of the graphical program elements are unsupported for the intended target device of the graphical program comprises:
indicating a first invalid condition for the first graphical program element; and
indicating a second invalid condition for the second graphical program element.

14. The method of claim 1, further comprising:
displaying one or more suggestions for changing the graphical program so that each graphical program element present in the graphical program is supported for the intended target device of the graphical program.

15. The method of claim 14,
wherein the graphical program includes a first graphical program element that is unsupported for the intended target device of the graphical program;
wherein said displaying the one or more suggestions comprises displaying a suggestion to replace the first graphical program element with a second graphical program element.

16. The method of claim 1,
wherein said storing the graphical program in the memory comprises storing one or more data structures representing the graphical program in the memory;
wherein said programmatically analyzing the graphical program to determine graphical program elements present in the graphical program comprises programmatically analyzing the one or more data structures to determine graphical program elements present in the graphical program.

17. The method of claim 1, further comprising:
receiving user input indicating the intended target device for deployment of the graphical program.

18. The method of claim 17, further comprising:
displaying a graphical user interface that indicates available target devices for deployment of the graphical program;
wherein said receiving user input indicating the intended target device for deployment of the graphical program comprises receiving user input to the graphical user interface.

19. The method of claim 17,
wherein said receiving user input indicating the intended target device comprises graphically associating a program icon representing the graphical program with a device icon representing the target device in response to user input.

20. The method of claim 19,
wherein said graphically associating the program icon with the device icon comprises dragging and dropping the program icon onto the device icon in response to user input.

21. The method of claim 19,
wherein said programmatically analyzing and programmatically determining are performed in response to said graphically associating the program icon with the device icon.

22. The method of claim 21,
wherein the graphical user interface indicates that the graphical program can be deployed on one or more of the following target devices:
a device including a programmable hardware element;
a personal digital assistant (PDA); and
a device including a processor and memory, wherein the memory stores a restricted version of a graphical program execution engine.

23. The method of claim 1,
wherein said indicating an invalid condition if any of the graphical program elements are unsupported for the intended target device of the graphical program comprises indicating an invalid condition for each unsupported graphical program element.

24. The method of claim 1,
wherein said indicating an invalid condition comprises altering an appearance of one or more of the unsupported graphical program elements in the graphical program.

25. The method of claim 1,
wherein said indicating an invalid condition if any of the graphical program elements are unsupported for the intended target device of the graphical program comprises displaying information to indicate that one or more of the graphical program elements are unsupported for the intended target device of the graphical program.

26. The method of claim 25,
wherein said displaying information to indicate that one or more of the graphical program elements are unsupported for the intended target device of the graphical program comprises displaying text information to indicate that the one or more graphical program elements are unsupported for the intended target device of the graphical program.

27. The method of claim 26,
wherein said displaying text information to indicate that the one or more graphical program elements are unsupported for the intended target device of the graphical program comprises displaying a list of error messages.

28. The method of claim 1,
wherein said indicating an invalid condition if any of the graphical program elements are unsupported for the intended target device of the graphical program comprises displaying information to indicate that a node present in the graphical program is unsupported for the intended target device of the graphical program.

29. The method of claim 28,
wherein said displaying information to indicate that a node present in the graphical program is unsupported for the intended target device of the graphical program comprises altering a visual appearance of the node in the graphical program.

30. The method of claim 28,
wherein said displaying information to indicate that a node present in the graphical program is unsupported for the intended target device of the graphical program comprises displaying text information to indicate that the node is unsupported for the intended target device of the graphical program.

31. The method of claim 1,
wherein said indicating an invalid condition if any of the graphical program elements are unsupported for the intended target device of the graphical program comprises displaying information to indicate that a wire present in the graphical program is unsupported for the intended target device of the graphical program.

32. The method of claim 31,
wherein said displaying information to indicate that a wire present in the graphical program is unsupported for the intended target device of the graphical program comprises altering a visual appearance of the wire in the graphical program.

33. The method of claim 31,
wherein said displaying information to indicate that a wire present in the graphical program is unsupported for the intended target device of the graphical program comprises displaying text information to indicate that the wire is unsupported for the intended target device of the graphical program.

34. The method of claim 1,
wherein the intended target device of the graphical program includes a programmable hardware element.

35. The method of claim 1,
wherein the intended target device of the graphical program comprises an FPGA.

36. The method of claim 1,
wherein the intended target device of the graphical program comprises a personal digital assistant (PDA).

37. The method of claim 1,
wherein the intended target device of the graphical program includes a processor and memory, wherein the memory stores a restricted version of a graphical program execution engine.

38. The method of claim 37, further comprising:
programmatically determining the restricted version of the graphical program execution engine;
wherein said programmatically determining whether any of the graphical program elements are unsupported for an intended target device of the graphical program is performed based on the restricted version of the graphical program execution engine.

39. The method of claim 1,
wherein said storing the graphical program in a memory comprises storing the graphical program in a memory of a first computer system, wherein the first computer system executes a first operating system;
wherein the intended target device of the graphical program comprises a second computer system that executes a second operating system.

40. The method of claim 1, further comprising:
creating the graphical program;
wherein said creating the graphical program comprises:
arranging a plurality of nodes on a display; and
interconnecting the plurality of nodes in response to user input.

41. The method of claim 1,
wherein the graphical program comprises a block diagram portion and a user interface portion.

42. The method of claim 1,
wherein the graphical program comprises a graphical data flow program.

43. The method of claim 1,
wherein said pro grammatically determining whether any of the graphical program elements are unsupported for the intended target device of the graphical program comprises programmatically determining whether any of the graphical program elements are unsupported based on I/O resources of the intended target device.

44. The method of claim 1, further comprising:
producing an error which prevents the graphical program from being compiled if any of the graphical program elements are unsupported for the intended target device of the graphical program.

45. The method of claim 1, further comprising:
producing a warning that does not prevent the graphical program from being compiled if any of the graphical program elements are unsupported for the intended target device of the graphical program.

46. The method of claim 1, wherein said programmatically analyzing, said programmatically determining, and said indicating are performed at edit-time.

47. A computer-implemented method for analyzing a graphical program, the method comprising:
storing the graphical program in a memory, wherein the graphical program includes graphical code comprising a plurality of interconnected nodes that visually indicate functionality of the graphical program;
programmatically analyzing the graphical program to determine graphical program elements present in the graphical program;
programmatically determining whether any of the graphical program elements are unsupported for an intended target device of the graphical program; and
programmatically modifying the graphical program so that each graphical program element in the graphical program is supported for the intended target device of the graphical program.

48. A computer-implemented method for analyzing a graphical program, the method comprising:
storing the graphical program in a memory, wherein the graphical program includes graphical code comprising a plurality of interconnected nodes that visually indicate functionality of the graphical program;
programmatically analyzing the graphical program to determine graphical program elements present in the graphical program;
programmatically determining whether any combination of the graphical program elements is unsupported for an intended target device of the graphical program; and
indicating an invalid condition if any combination of the graphical program elements are unsupported for the intended target device of the graphical program.

49. A computer-implemented method for analyzing a graphical program for deployment on two different target devices, the method comprising:
storing the graphical program in a memory, wherein the graphical program includes graphical code comprising a plurality of interconnected nodes that visually indicate functionality of the graphical program;
programmatically analyzing the graphical program to determine whether the graphical program can execute properly on a first target device;
programmatically analyzing the graphical program to determine whether the graphical program can execute properly on a second target device; and
indicating an invalid condition if the graphical program cannot execute correctly on one or more of the first target device and/or the second target device.

50. The method of claim 49,
wherein the first target device is a different kind of device than the second target device.

51. The method of claim 49,
wherein the first target device and the second target device are each selected from the group consisting of:
a device including a programmable hardware element;
a personal digital assistant (PDA); and
a device including a processor and memory, wherein the memory stores a restricted version of a graphical program execution engine.

52. A computer-implemented method for analyzing a graphical program, the method comprising:
storing the graphical program in a memory, wherein the graphical program includes graphical code comprising a plurality of interconnected nodes that visually indicate functionality of the graphical program;
programmatically analyzing the graphical program to determine graphical program elements present in the graphical program;
programmatically determining whether any of the graphical program elements are used in an unsupported manner for an intended target device of the graphical program; and
indicating an invalid condition if any of the graphical program elements are used in an unsupported manner for the intended target device of the graphical program.

53. A computer-implemented method for analyzing a graphical program, the method comprising:
storing the graphical program in a memory, wherein the graphical program includes graphical code comprising a plurality of interconnected nodes that visually indicate functionality of the graphical program;
programmatically analyzing the graphical program to determine semantics of the graphical program;
determining whether the graphical program can execute correctly on an intended target device of the graphical program, based on the semantics of the graphical program; and
indicating an invalid condition if the graphical program cannot execute correctly on the intended target device of the graphical program.

54. A computer-implemented method for analyzing a graphical program, the method comprising:
storing the graphical program in a memory, wherein the graphical program includes graphical code comprising a plurality of interconnected nodes that visually indicate functionality of the graphical program;
programmatically analyzing the graphical program to determine syntax of the graphical program;
determining whether the graphical program can execute correctly on an intended target device of the graphical program, based on the syntax of the graphical program; and
indicating an invalid condition if the graphical program cannot execute correctly on the intended target device of the graphical program.

55. A computer-implemented method for analyzing a graphical program, the method comprising:
storing the graphical program in a memory of a first computer system, wherein the graphical program includes graphical code comprising a plurality of interconnected nodes that visually indicate functionality of the graphical program;
receiving user input specifying an intended target device for the graphical program;
programmatically analyzing the graphical program to determine graphical program elements present in the graphical program;
programmatically determining whether any of the graphical program elements has execution behavior on the intended target device that differs from its execution behavior on the first computer system; and
indicating information specifying that one or more of the graphical program elements have execution behavior on the intended target device that differs from their execution behavior on the first computer system, if one or more of the graphical program elements have execution behavior on the intended target device that differs from their execution behavior on the first computer system.

56. A computer-implemented method for analyzing a graphical program, the method comprising:
storing the graphical program in a memory in a memory of a first computer system, wherein the graphical program includes graphical code comprising a plurality of interconnected nodes that visually indicate functionality of the graphical program;
receiving user input specifying an intended target device for the graphical program;
programmatically analyzing the graphical program to determine graphical program elements present in the graphical program;
programmatically determining whether any of the graphical program elements has semantics on the intended target device that differs from its semantics on the first computer system; and
indicating information specifying that one or more of the graphical program elements have semantics on the intended target device that differs from their semantics on the first computer system, if one or more of the graphical program elements have semantics on the intended target device that differs from their semantics on the first computer system.

* * * * *

UNITED STATES PATENT AND TRADEMARK OFFICE
CERTIFICATE OF CORRECTION

| | |
|---|---|
| PATENT NO. | : 7,028,222 B2 |
| APPLICATION NO. | : 10/177553 |
| DATED | : April 11, 2006 |
| INVENTOR(S) | : Petersen et al. |

It is certified that error appears in the above-identified patent and that said Letters Patent is hereby corrected as shown below:

Title page, item [75]

<u>The Inventors:</u>

Please delete the first inventor "Newton G. Peterson", and substitute -- Newton G. Petersen --.

Signed and Sealed this

Twenty-fifth Day of July, 2006

JON W. DUDAS
*Director of the United States Patent and Trademark Office*